United States Patent
Cheng

(10) Patent No.: US 7,296,321 B2
(45) Date of Patent: Nov. 20, 2007

(54) TABLETOP WOOD-WASTE-COLLECTING MACHINE

(75) Inventor: Chieh-Yuan Cheng, Taichung (TW)

(73) Assignee: San Ford Machinery Co., Ltd., Taichung (TW)

( * ) Notice: Subject to any disclaimer, the term of this patent is extended or adjusted under 35 U.S.C. 154(b) by 425 days.

(21) Appl. No.: 10/981,774

(22) Filed: Nov. 5, 2004

(65) Prior Publication Data

US 2006/0096054 A1 May 11, 2006

(51) Int. Cl.
*A47L 5/38* (2006.01)

(52) U.S. Cl. .......................... 15/304; 15/314; 15/316.1; 108/50.13; 108/50.18

(58) Field of Classification Search .................. None
See application file for complete search history.

(56) References Cited

U.S. PATENT DOCUMENTS

| | | | | |
|---|---|---|---|---|
| 1,211,325 A * | 1/1917 | Lilly | ........................... | 34/569 |
| 2,973,790 A * | 3/1961 | Huetter | ........................ | 100/90 |
| 3,442,230 A * | 5/1969 | Polen | ........................... | 108/24 |
| 6,101,666 A * | 8/2000 | Cheng | ........................ | 15/301 |
| 6,792,878 B2 * | 9/2004 | Cheng | ..................... | 108/50.13 |
| 6,802,266 B2 * | 10/2004 | Cheng | ..................... | 108/50.13 |
| 7,040,239 B2 * | 5/2006 | Shelton et al. | ........... | 108/50.13 |
| 2005/0098006 A1 * | 5/2005 | Jorgensen | .................... | 83/100 |

\* cited by examiner

*Primary Examiner*—David Redding
(74) *Attorney, Agent, or Firm*—Ming Chow; Sinorica, LLC

(57) ABSTRACT

A tabletop wood-waste-collecting machine includes a support frame, a machine base, a guide shade, a work faceplate and a dust-collecting unit. The machine base has its opposite upper side bored with plural transverse assistant guide grooves and its central portion bored with a longitudinal lower main guide groove communicating with a connecting opening in the front center. The guide shade covered on the lower main guide groove is formed with an upper guide groove. The work faceplate fixed on the topside of the machine base is bored with numerous wind-sucking vents. When the dust-collecting unit is started to operate, every wind-sucking vent of the work faceplate and the wind-sucking space in the machine base will receive a balanced suction force to let the wood waste produced completely sucked out.

5 Claims, 5 Drawing Sheets

TABLETOP WOOD-WASTE-COLLECTING MACHINE

BACKGROUND OF THE INVENTION

1. Field of the Invention

This invention relates to a table-top wood-waste-collecting machine, particularly to one enabling, every wind-sucking vent of a work faceplate and every location of a wind-sucking space under the work faceplate to receive a suction force in a balanced condition to let wood waste dropping in the dust-sucking space completely and smoothly guided and sucked to a dust-collecting unit.

2. Description of the Prior Art

A conventional tabletop wood-waste-collecting machine 10, as shown in FIG. 1, includes a support frame 11, a machine base 12, a work faceplate 13 and a dust-collecting unit 14 combined together. The machine base 12 positioned on the support frame 11 is provided with a base plate 121 having its peripheral side extending upward and forming a peripheral edge 122 and its central portion bored with a connecting opening 123 communicating with the dust-collecting unit 14. The work faceplate 13 covered on the machine base 12 is provided with a top plate 131 for placing work pieces thereon, having an accommodating space 132 is formed between the top plate 131 of the work faceplate 13 and the machine base 12. Further, the top plate 131 is bored with a plurality of wind-sucking vents 133. Thus, when the dust-collecting unit 14 is started to operate, there will produce a vacuum suction force in the accommodating space 132 formed between the machine base 12 and the work faceplate 13 so that wood waste produced during wood processing can be sucked into the accommodating space 132 through the wind-sucking vents 133 of the work faceplate 13. Simultaneously, the wood waste is sucked to the dust-collecting unit 14 to be collected and removed through the connecting opening 123 under the center of the accommodating space 132.

However, the base plate 121 of the machine base 12 is a flat plate, and the connecting opening 123 of machine base 12 is located in the center; therefore, when the dust-collecting unit 14 is started to operate, a comparatively huge vacuum suction force will be produced around the base plate 121 of the machine base 12 and the wind-sucking vents 133 of the work faceplate 13, which are near the connecting opening 123, but the vacuum suction force produced at the locations that are far away from the connecting opening 123 will be comparatively small. Such unbalanced suction force may make some wood waste remain at or stick to the place where suction force is small, unable to exhaust out the wood waste completely, and it is necessary to have the tabletop wood-waste-collecting machine 10 disassembled for cleaning regularly.

SUMMARY OF THE INVENTION

The objective of the invention is to offer a tabletop wood-waste-collecting machine composed of a support frame, a machine base, a guide shade, a work faceplate and a dust-collecting unit. The machine base has its opposite upper sides respectively bored with a plurality of transverse assistant guide grooves and its central portion bored with a longitudinal lower main guide groove positioned between the left and the right transverse assistant guide grooves and communicating with a connecting opening at the front side. The guide shade with an upper guide groove is fixedly covered on a preset location of the lower main guide groove. The work faceplate is fixed on the topside of the machine base.

In this invention, every wind-sucking vent of the work faceplate and the wind-sucking space formed in the interior of the machine base are able to receive a balanced suction force, and the base surfaces of the upper guide groove of the guide shade and the transverse assistant guide grooves of the machine base are slope-shaped; therefore, the wood waste dropping in the upper guide groove and the transverse assistant guide grooves can be respectively guided into the lower main guide groove and then sucked to the dust-collecting unit, having excellent effect of dust removing.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
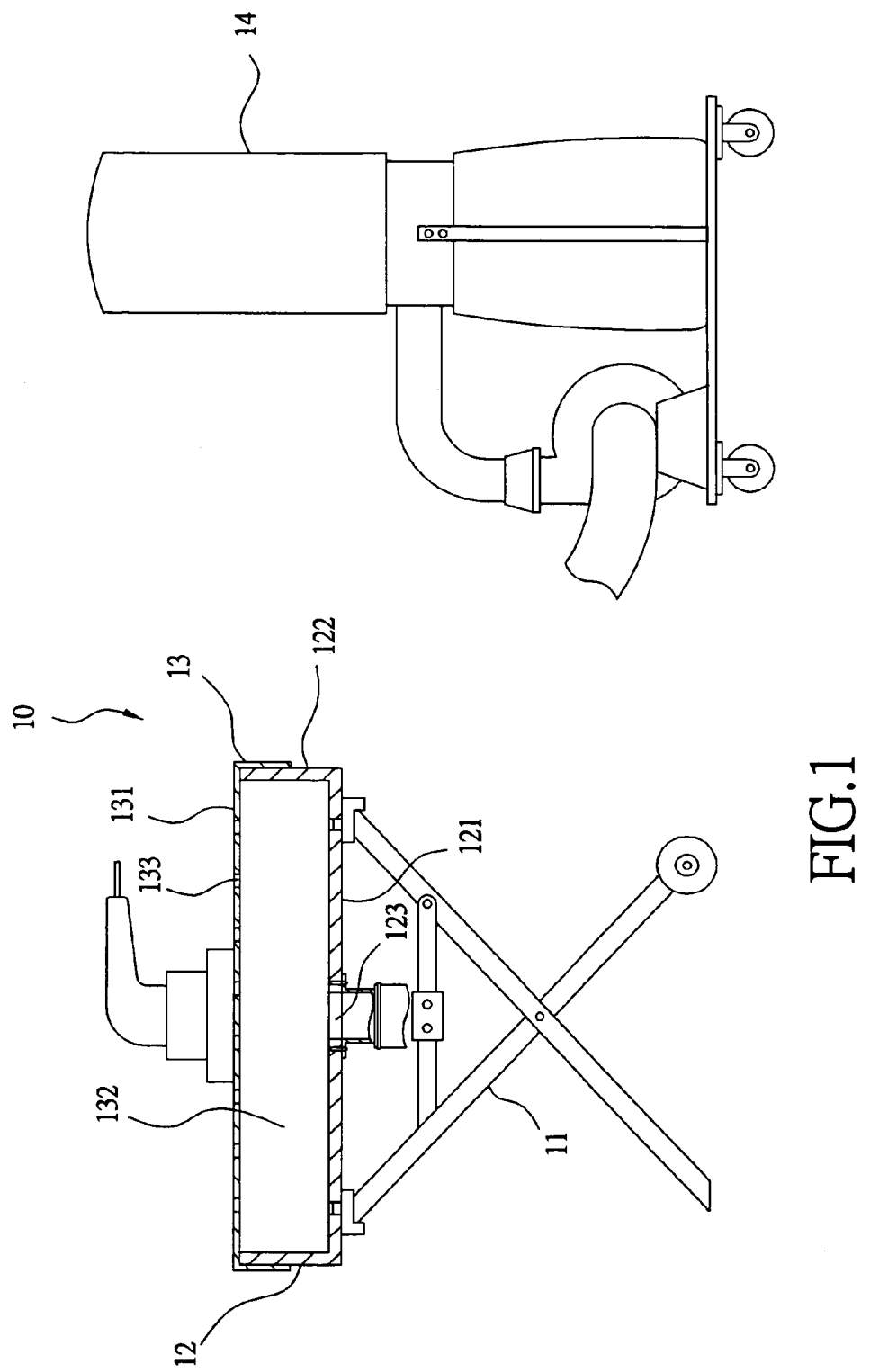
FIG. 1 is a cross-sectional view of a conventional tabletop wood-waste-collecting machine.
Figure 2:
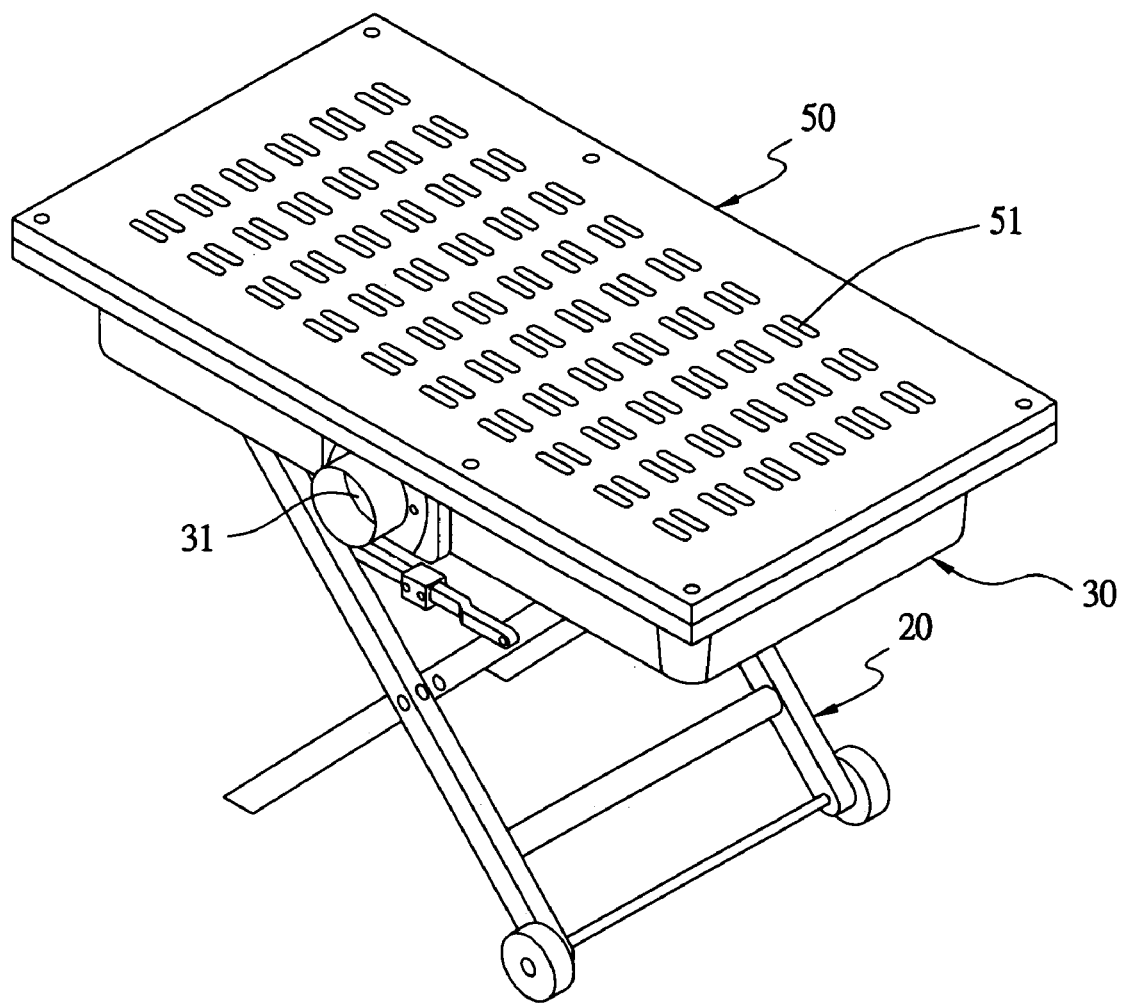
FIG. 2 is a partial perspective view of a tabletop wood-waste-collecting machine in the present invention.
Figure 3:
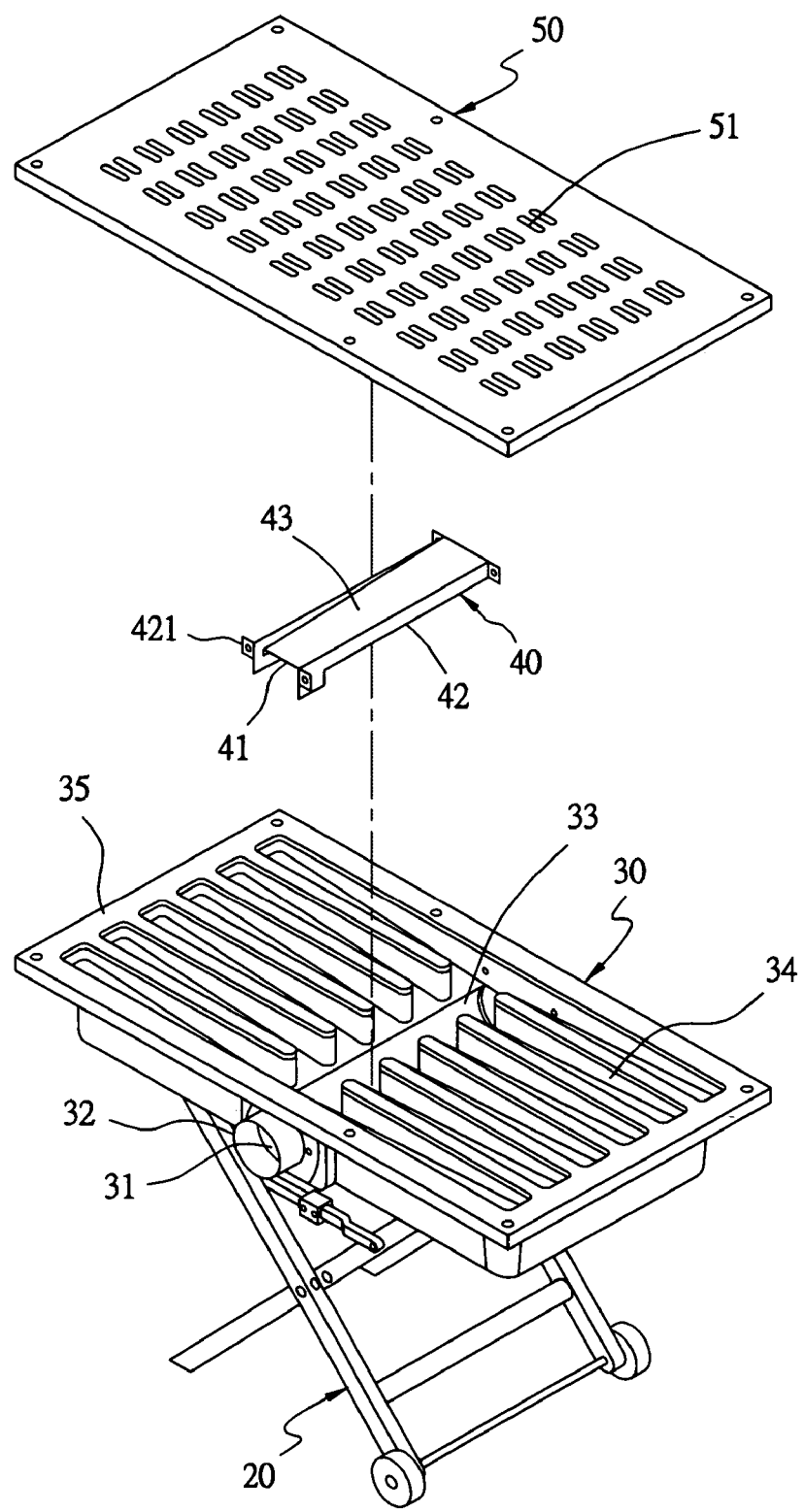
FIG. 3 is a partial exploded perspective view of the tabletop wood-waste-collecting machine in the present invention.
Figure 4:
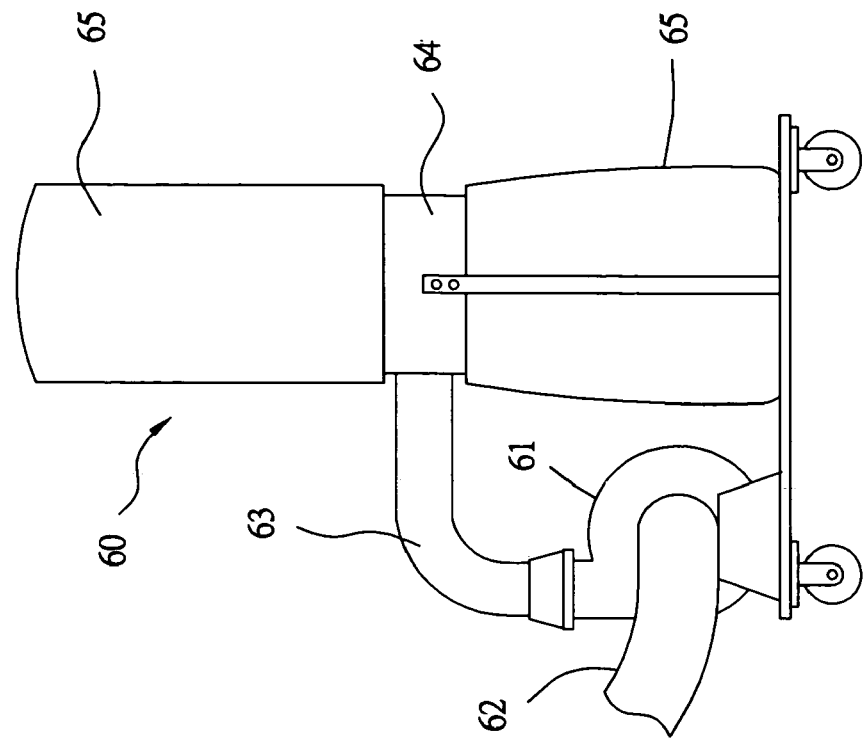
FIG. 4 is a cross-sectional view of the tabletop wood-waste-collecting machine in the present invention.
Figure 4:
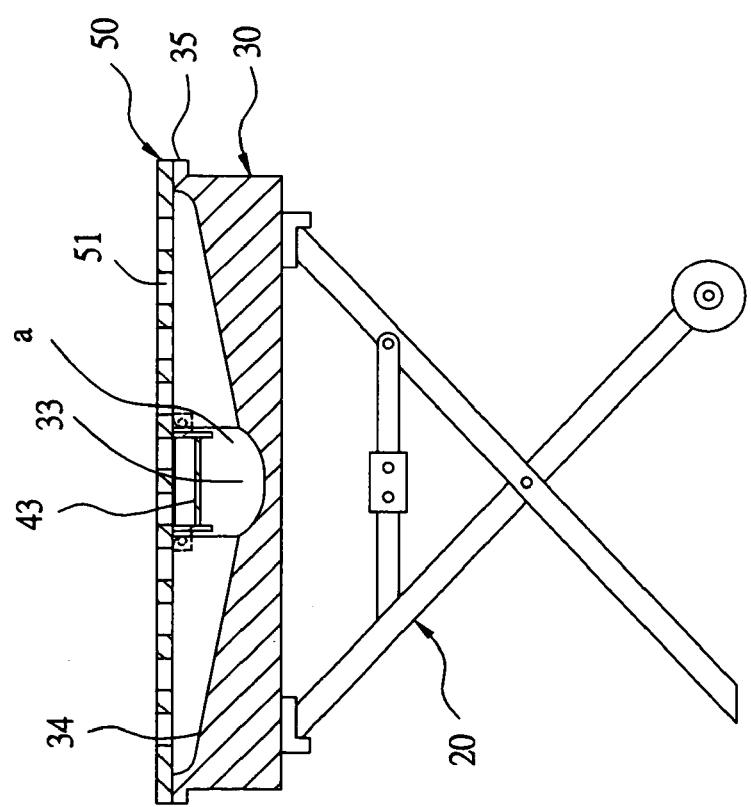

A preferred embodiment of a table-top wood-waste-collecting machine in the present invention, as shown in FIGS. 2, 3 and 4, includes a support frame 20, a machine base 30, a guide shade 40, a work faceplate 50 and a dust-collecting unit 60 combined together.

The support frame 20 is collapsible and able to stand on the ground.

The machine base 30 to be fixed on the support frame 20 has a longitudinal connecting opening 31 bored in a front portion and having its outer side secured with a pipe adapter 32. Further, the machine base 30 has a longitudinal lower main guide groove 33 bored in the topside near an intermediate portion and slanting downward toward the front end to communicate with the connecting opening 31. The lower main guide groove 33 has its opposite upper sides respectively bored with a plurality of transverse assistant guide grooves 34 connected with the opposite edges of the lower main guide groove 33 and respectively having the base surface slanting downward toward the central portion of the machine base 30. Furthermore, the machine base 30 has its upper peripheral side formed with a horizontal combining edge 35.

Figure 5:
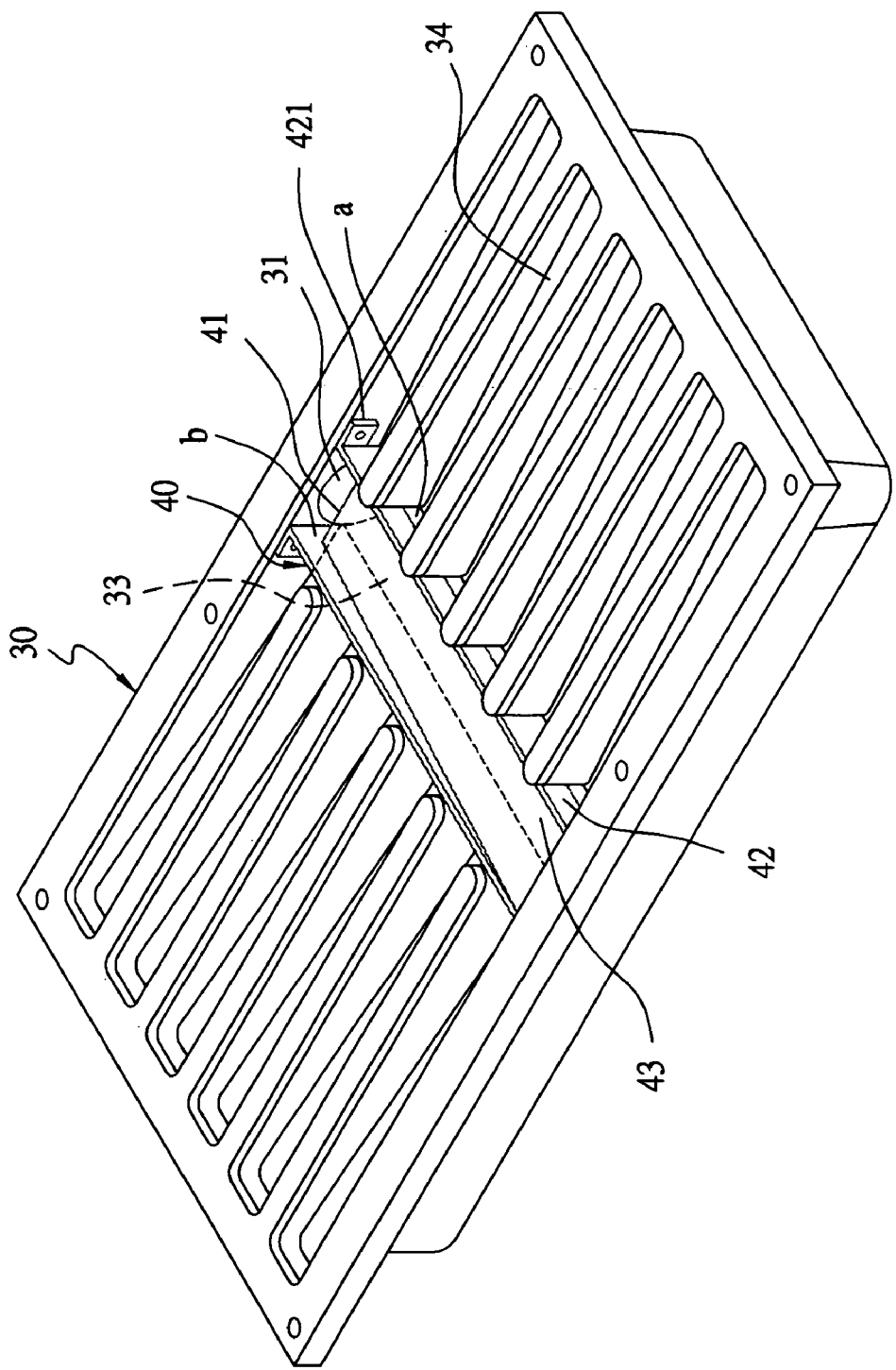
FIG. 5 is a partial perspective view of the machine base of the tabletop wood-waste-collecting machine in the present invention.

The guide shade 40, as shown in FIGS. 3 and 5, consists of a base plate 41 and two side plates 42 positioned at the opposite sides of the base plate 41, having an upper guide groove 43 defined by the base plate 41 and the two side plates 42 and slanting downward toward the front end. Each side plate 42 has its front and rear end respectively provided with a combining member 421 to be combined on the corresponding inner wall of the machine base 30 so as to firmly cover the guide shade 40 on a proper portion of the lower main guide groove 33 of the machine base 30, letting the front deep end of the upper guide groove 43 aligned to the connecting opening 31 of the machine base 30 and having an exhausting opening (a) with a preset size formed between the side plate 42 and the connecting place of each assistant guide groove 34 and the lower main guide groove 33. Thus, wood waste dropping in each assistant guide groove 34 can respectively move into the lower main guide groove 33 along the slanting base surface and through the exhausting opening (a). In addition, an exhausting gap (b) with a preset size is formed between the lower end of the base plate 41 of the guide shade 40 facing the connecting opening 31, and the corresponding inner wall of the machine base 30 so that the wood waste dropping in the upper guide groove 43 can move into the lower main guide groove 33 along the slanting base surface and through the exhausting gap (b) to be gathered therein and then sucked to the dust-collecting unit 60 through the connecting opening 31.

The work faceplate 50 is fixedly combined with the combining edge 35 of the machine base 30 and covered on the topside of the machine base 30 to form a wind-sucking space between them. The topside of the work faceplate 50 for placing work piece thereon is bored with numerous wind-sucking vents 51.

The dust-collecting unit 60 consists of a blower 61 having a wind-sucking pipe 62 connected with the pipe adapter 32 of the machine base 30 and a wind-exhausting pipe 63 connected with a wind-exhausting box 64, which has its upper and lower side respectively fitted with a dust-collected bag 65. Thus, when the blower 61 is started to operate, a vacuum suction force will be produced at the location of the connecting opening 31 of the machine base 30 through the wind-sucking pipe 62, and the wind-sucking space between the machine base 30 and the work faceplate 50 will receive a comparatively balanced suction force that is able to completely suck wood waste on the work faceplate 50 and in the wind-sucking space into the dust-collecting bag 65, in which wood waste stays.

Specifically, as shown in FIGS. 3, 4 and 5, when the dust-collecting unit 60 is started to operate, a balanced suction force will be produced at the location of every wind-sucking vent 51 of the work faceplate 50. Thus, wood waste produced on any part of the work faceplate 50 during wood processing can be completely sucked into both the upper guide groove 43 of the guide shade 40 and the assistant guide grooves 34 of the machine base 30 through the wind-sucking vents 51 of the work faceplate 50. Simultaneously, the wood waste dropping in the upper guide groove 43 is actuated by the suction force and by its own gravity to drop in the lower main guide groove 33 of the machine base 30 along the slanting base surface of the upper guide groove 43 and through the exhausting gap (b) and instantly sucked to and collected to the dust-collecting unit 60 through the connecting opening 31. On the other hand, the wood waste dropping in the assistant guide grooves 34 is actuated by the suction force and by its own gravity to drop in the lower main guide groove 33 along the slanting base surfaces of the assistant guide grooves 34 and through the exhausting opening (a) and instantly sucked to the dust-collecting unit 60 along the slanting base surface of the lower main guide groove 33.

To sum up, the table-top wood-waste-collecting machine in the present invention has the machine base 30 bored with a plurality of transverse assistant guide grooves 34 in the left and the right topside and a longitudinal lower main guide groove 33 in the central portion and also has the guide shade 40 formed with an upper guide groove 43, and the base surfaces of the guide grooves 34, 33 and 43 are respectively slope-shaped. By so designing, every wind-sucking vent 51 of the work faceplate 50 can receive a balanced suction force, and the wood waste dropping in the wind-sucking space under the work faceplate 50 can be completely guided and moved to the connecting opening 31 in the front center of the machine base 30 and then sucked to and collected by the dust-collecting unit 60. Thus the machine in the invention is able to produce a balanced suction force for completely sucking out wood waste, having an excellent effect of dust exhausting and lowering the cost for maintenance and repair of the dust-collecting machine.

While the preferred embodiment of the invention has been described above, it will be recognized and understood that various modifications may be made therein and the appended claims are intended to cover all such modifications that may fall within the spirit and scope of the invention.

I claim:

1. A tabletop wood-waste-collecting machine comprising:

a support frame collapsible and able to stand on the ground;

a machine base fixed on said support frame, said machine base bored with a longitudinal connecting opening, said machine base bored with a longitudinal lower main guide groove, said lower main guide groove communicating with said connecting opening, said lower main guide groove slanting downward to said connecting opening, said machine base having its left and right upper side respectively bored with a plurality of transverse assistant guide grooves spaced apart, said transverse assistant guide grooves being located to be substantially transverse to the lower main guide groove, said transverse assistant guide grooves being respectively connected with the opposite edges of said lower main guide groove, each said assistant guide groove formed with a slope-shaped base surface slanting downward to the central portion of said machine base;

a guide shade formed with a base plate and two side plates, an upper guide groove defined by said base plate and said two side plates, said upper guide groove having its base surface slanting downward towards the connecting opening of said machine base, said guide shade lengthwise covered on a preset portion of said lower main guide groove of said machine base, a plurality of exhausting opening with a preset size respectively formed between said two side plates of said guide shade and the connecting place of each said assistant guide groove and said lower main guide groove, wood waste dropping in each said assistant guide groove able to be sucked to said lower main guide groove along the slanting base surface of said assistant guide groove and through said exhausting opening, an exhausting gap with a preset size formed between the lower end of said base plate of said guide shade and the corresponding inner wall of said machine base, wood waste dropping in said upper guide groove of said guide shade sucked in said lower main guide groove along the slanting base surface of said upper guide groove and through said exhausting gap, said wood waste in said lower main guide groove then sucked out through said connecting opening of said machine base;

a work faceplate fixed on the topside of said machine base, a wind-sucking space formed between said topside of said machine base and said work faceplate, the topside of said work faceplate able to be used for placing work piece thereon, said topside of said work faceplate bored with numerous wind-sucking vents; and a dust-collecting unit connected with said connecting opening of said machine base by a wind-sucking pipe, a vacuum suction force produced at the location of said connecting opening when said dust-collecting unit is started to operate, said wind-sucking space between said machine base and said work faceplate able to receive a balanced suction force.

2. The table-top wood-waste-collecting machine as claimed in claim 1, wherein said connecting opening, said lower main guide groove and said assistant guide grooves of said machine base are formed integral.

3. The table-top wood-waste-collecting machine as claimed in claim 1, wherein a pipe adapter is secured on the outer side of said connecting opening of said machine base for connecting said dust-collecting unit by said wind-sucking pipe.

4. The table-top wood-waste-collecting machine as claimed in claim 1, wherein said machine base has its upper peripheral side formed with a horizontal combining edge for combining said work faceplate.

5. The dust-top wood-waste-collecting machine as claimed in claim 1, wherein said two side plates of said guide shade have their front and rear end respectively provided with a combining member extending outward vertically to be fastened on the inner wall of said machine base.

\* \* \* \* \*